United States Patent
Campbell et al.

(10) Patent No.: US 11,480,445 B2
(45) Date of Patent: Oct. 25, 2022

(54) METHOD AND APPARATUS FOR INDUSTRIAL PRODUCT TAMPER DETECTION

(71) Applicant: Rockwell Automation Technologies, Inc., Mayfield Heights, OH (US)

(72) Inventors: Alan J. Campbell, Mequon, WI (US); Joseph D. Riley, Mequon, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 16/936,111

(22) Filed: Jul. 22, 2020

(65) Prior Publication Data

US 2022/0026241 A1 Jan. 27, 2022

(51) Int. Cl.
| | |
|---|---|
| *G06F 21/86* | (2013.01) |
| *G01D 5/12* | (2006.01) |
| *G05B 15/02* | (2006.01) |
| *G06F 1/26* | (2006.01) |
| *H05K 5/02* | (2006.01) |

(52) U.S. Cl.
CPC .............. *G01D 5/12* (2013.01); *G05B 15/02* (2013.01); *G06F 1/266* (2013.01); *G06F 21/86* (2013.01); *H05K 5/0208* (2013.01); *G05B 2219/2628* (2013.01)

(58) Field of Classification Search
CPC ....................... G07D 11/225; G06K 19/07381
USPC ....................................................... 700/275
See application file for complete search history.

(56) References Cited

U.S. PATENT DOCUMENTS

| | | | |
|---|---|---|---|
| 5,689,243 A * | 11/1997 | Bianco | G06F 21/552 340/5.26 |
| 5,912,621 A * | 6/1999 | Schmidt | G06F 1/16 340/571 |
| 5,945,915 A | 8/1999 | Cromer et al. | |
| 2011/0118013 A1* | 5/2011 | Mattice | G07F 17/3202 463/30 |
| 2013/0119974 A1* | 5/2013 | Chamarti | G01R 22/066 324/110 |
| 2013/0305062 A1 | 11/2013 | Falk et al. | |
| 2017/0116440 A1 | 4/2017 | Huang et al. | |
| 2017/0183135 A1* | 6/2017 | Pic | B65D 1/023 |
| 2020/0134233 A1* | 4/2020 | Lillestolen | G06F 21/86 |

OTHER PUBLICATIONS

Extended European Search Report, application No. EP21183638.2, dated Dec. 21, 2021.

* cited by examiner

*Primary Examiner* — Emilio J Saavedra
(74) *Attorney, Agent, or Firm* — Fay Sharpe LLP (57) ABSTRACT

A tamper detection apparatus includes a switch and a tamper detection circuit with a non-volatile memory in an industrial product enclosure. In response to the switch detecting a door or panel of an industrial product enclosure being open when an electronic component or system in the enclosure is unpowered, the tamper detection circuit stores a tamper event code in the non-volatile memory. After the electronic component or system is powered, a system processor obtains the tamper event code from the tamper detection circuit and refrains from operating a machine or process pending reset of the industrial product by a user.

5 Claims, 9 Drawing Sheets

METHOD AND APPARATUS FOR INDUSTRIAL PRODUCT TAMPER DETECTION

BACKGROUND INFORMATION

The subject matter disclosed herein relates to industrial products and more particularly to tamper detection in industrial products.

BRIEF DESCRIPTION

Disclosed examples include an industrial product and a tamper detection apparatus thereof that includes a switch and a tamper detection circuit with a non-volatile memory in an industrial product enclosure. In response to the switch detecting a door or panel of the enclosure being open when an electronic component or system in the enclosure is unpowered, the tamper detection circuit stores a tamper event code in the non-volatile memory. A method includes detecting a door or panel of an industrial product enclosure being in an open position and, in response to detecting the door or panel of an industrial product enclosure being in the open position, storing a tamper event code in a non-volatile memory.

DETAILED DESCRIPTION

Figure 1:
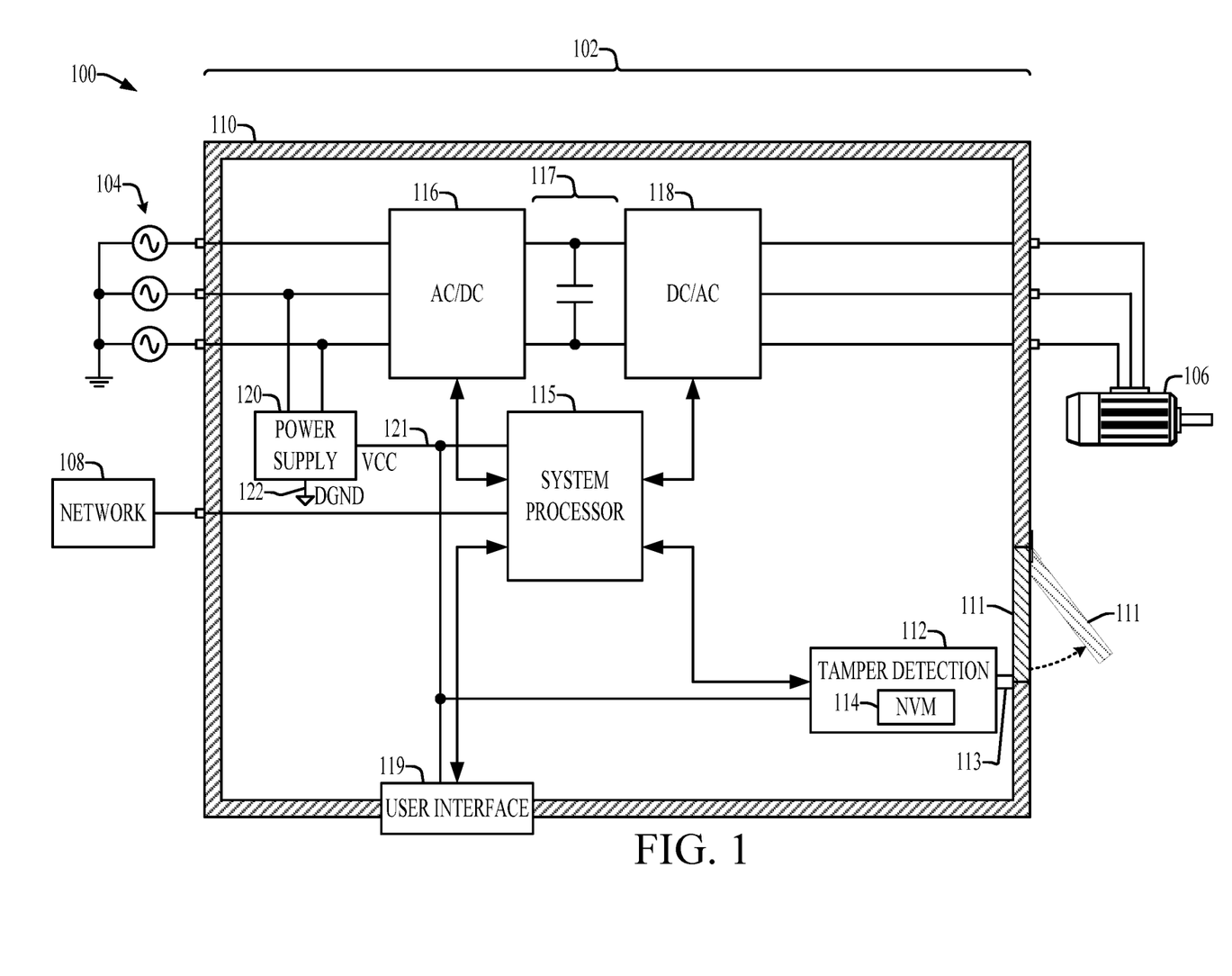
FIG. 1 is a schematic diagram of an industrial system.

FIG. 1 is a schematic diagram of an industrial system 100 with an industrial product 102 powered by a three phase AC power source or supply 104. In one example, the industrial product 102 is a motor drive that converts power from the AC power source 104 to provide output power to drive a motor load 106. In other examples, the industrial product 102 is a process or machine controller or control module, I/O module, programmable logic controller (PLC) or other industrial apparatus capable of, or otherwise configured or configurable for, when powered, controlling a machine (e.g., the motor 106) or a process. The industrial product 102 includes communications cabling or connections to communicate with a network 108, such as an industrial Ethernet network or other communications network and elements thereof.

The industrial product 102 includes an enclosure 110 that has or defines an interior. The enclosure 110 includes a door or panel 111. The door or panel 111 has an open position that allows user access to an interior of the enclosure 110, shown in phantom line in FIG. 1. The door or panel 111 has a closed position that prevents user access to the interior of the enclosure 110. The closed position of the door or panel 111 need not provide an air-tight or hermetic seal of the enclosure 110.

The industrial product 102 includes tamper detection apparatus configured in one example to detect events in which the door or panel 111 is in the open position that allows user access to an interior of the enclosure 110. Moreover, the tamper detection apparatus provides detection of potential tampering even when the industrial product 102 is powered down, for example, when at least one electronic component or system of the industrial product is in an unpowered state. This advantageously facilitates user notification that the industrial product 102 may have been tampered with while not in use to control the motor 106. The tamper detection apparatus includes a tamper detection circuit 112 and a switch 113 located in the interior of the enclosure 110 to prevent disablement. The tamper detection circuit 112 includes a non-volatile memory 114 to store tamper event codes which can be accessed at the industrial product 102 or through the network 108 for assessment by a user or operator, or by a supervisory system connected to the network 108. When the at least one electronic component or system of the industrial product 102 is in the unpowered state, the detection circuit 112 detects the door or panel 111 being in the open position, and stores a tamper event code in the non-volatile memory 114 in response to detection of the door or panel 111 being in the open position when the electronic component or system is in the unpowered state. In certain examples, moreover, the detection circuit 112 operates to detect tampering when the electronic component or system of the industrial product 102 are powered.

The industrial product 102 includes at least one electronic component or system located in the interior of the enclosure 110 that operate in a powered state when powered by a power supply to control a machine or process, and the at least one electronic component or system is inoperative in an unpowered state when not powered by the power supply. The example motor drive industrial product 102 in FIG. 1 has multiple electronic components or systems located in the interior of the enclosure 110, including a system processor 115, an AC to DC converter (e.g., a rectifier) 116, a DC bus circuit 117 with a bus capacitor, a DC to AC converter (e.g., an inverter) 118, and a user interface 119 that are selectively powered by a power supply 120 with a first output 121 to provides a DC supply voltage VCC, and a ground or reference terminal 122 at a ground potential DGND. The electronic components or systems 115, 116, 117, and 118 are selectively operative in the powered state when powered by the power supply 120 to control the motor 106. When not powered by the power supply 120, the electronic components or systems 115, 116, 117, and 118 are inoperative to control the motor 106.

In operation in the powered state, the example motor drive industrial product 102 receives three-phase electrical input power from the power source 104. A single-phase input can be used in other implementations. In one example, the AC to DC converter is a passive rectifier that provides DC voltage to the DC bus 117. In another implementation, the AC to DC converter 116 is an active front end (AFE) switching rectifier with switching devices operated according to switching control signals from the system processor 115 to convert AC input power from the source 104 to provide DC power as a controlled DC bus voltage signal across the DC bus capacitor of the intermediate DC bus circuit 117.

The DC bus voltage is provided as an input to the DC to AC inverter 118 that includes switching devices operated according to inverter switching control signals from the system processor 115. The switching operation of the inverter 118 converts the DC power from the bus circuit 117 to AC output power provided as multi-phase variable frequency, variable amplitude AC output signals at phase lines to drive the motor load 106. In other implementations, the inverter 118 provides a single-phase output signal to control a motor or other AC load. The system processor 115 in one implementation includes analog circuitry as well as one or more processors and associated memory provided with programming instructions to implement the rectifier and inverter switching control functions according to known pulse width modulation switching control principles, for example, according to feedback signals or values from sensors in the motor drive industrial product 102 to control one or more of motor speed, torque, position, etc. according to one or more setpoint values.

The switch 113 has a first switch state (e.g., open) in response to the door or panel 111 being in the closed position, and a second switch state (e.g., closed) in response to the door or panel 111 being in the open position. In one example, in response to power up of the electronic components or systems 115, 116, 117, and/or 118, the system processor 115 obtains the tamper event code from the tamper detection circuit 112, and performs one or more of: sending a message to the network 108 to report the tamper event code, rendering a notification of the tamper event code on the user interface 119, and modifying operation of the industrial product 102 based on the tamper event code. In one example, in response to obtaining the tamper event code from the tamper detection circuit 112 after power up of the electronic component or system 115, 116, 117, 118, the system processor 115 deactivates control operations of the industrial product 102 by refraining from operating the motor 106 or other machine or process pending reset of the industrial product 102 by a user. In this manner, the user will be provided an opportunity to inspect the industrial product 102 or verify that the opening(s) of the door or panel 111 was not a tampering (e.g., a regularly scheduled maintenance event) before resetting a system event to again allow normal operation of the industrial product 102.

Figure 2:
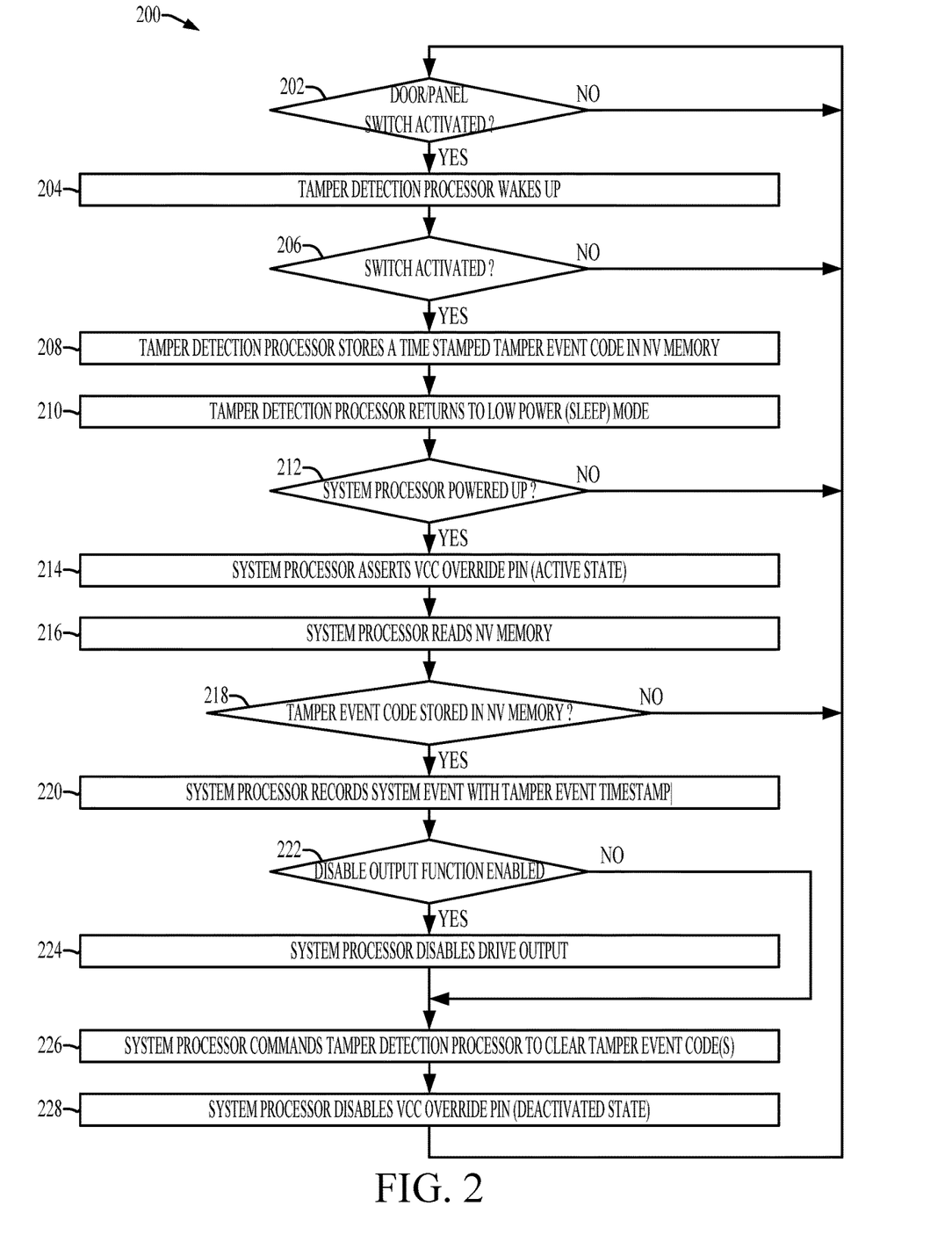
FIG. 2 is a flow diagram of a method.

FIG. 2 is a flow diagram of a method 200 that can be implemented in the industrial product 102 of FIG. 1 or in another industrial product or system to detect tampering. In one example, the method 200 is implemented by a tamper processor of the tamper detection circuit 112 (e.g., tamper detection processor 300 in FIGS. 3-6 below) and by the system processor 115. At 202 in FIG. 2, the method 200 includes detecting the door or panel 111 being in an open position that allows user access to an interior of the enclosure 110 when the electronic component or system (e.g., 115, 116, 117 and/or 118 in FIG. 1) in the interior of the enclosure 110 is in an unpowered state (e.g., not powered by the power supply 120). In one example, the industrial product 102 includes a breaker or power switch operable by a user to couple the AC input power to the power supply 120 to start the drive. Until activated, the power supply 120 in one example does not power the electronic components or systems 115, 116, 117 or 118 and the electronic components or systems remain in the unpowered state.

Figure 3:
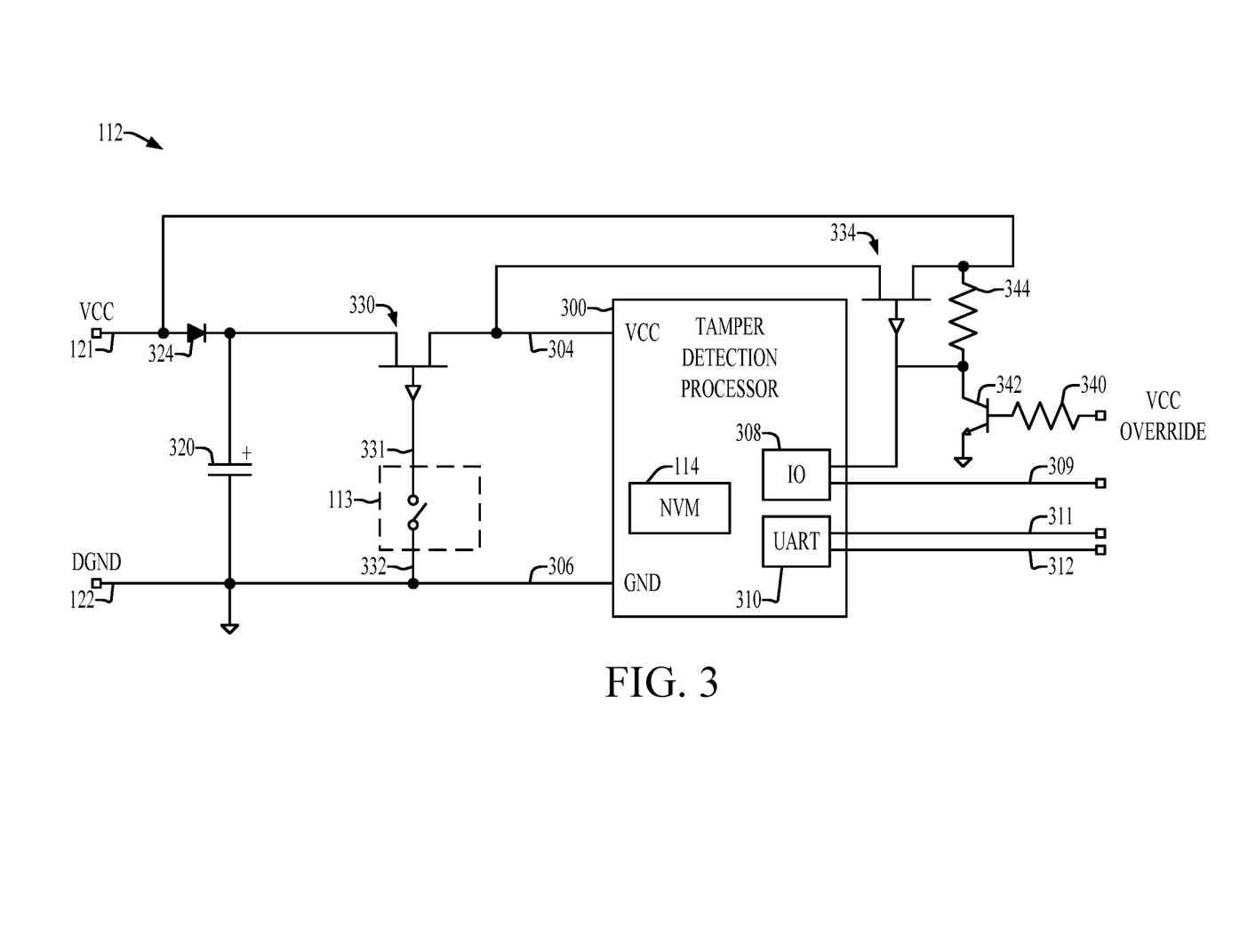
FIG. 3 is a schematic diagram of an example tamper detection circuit in the system of FIG. 1.
Figure 4:
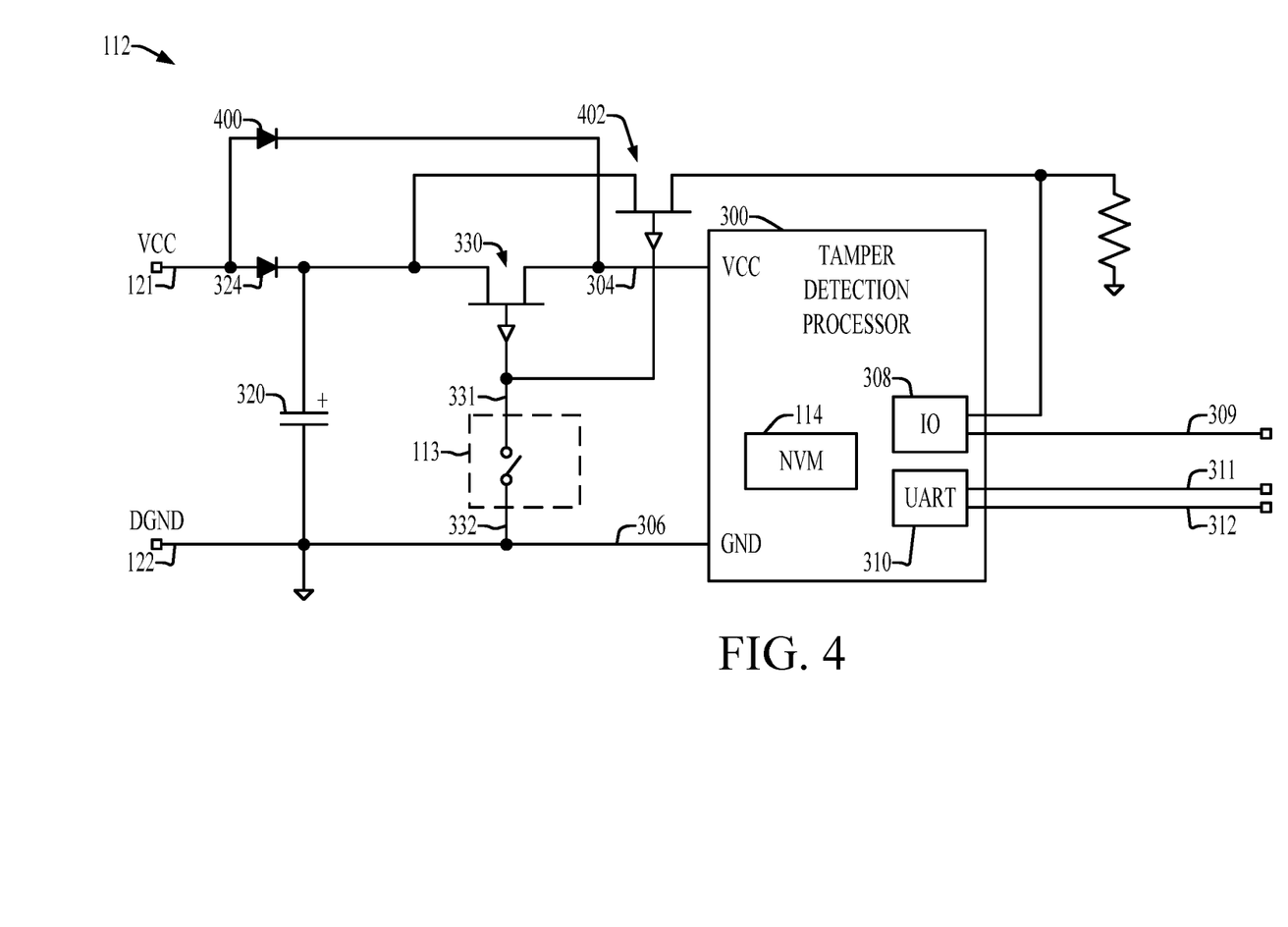
FIG. 4 is a schematic diagram of another example tamper detection circuit in the system of FIG. 1.

In one example, in response to detecting the door or panel 111 being in the open position at 202, the tamper detection processor 300 wakes up at 204. In the examples of FIGS. 3 and 4 below, the switch 113 causes power to be applied to the tamper detection processor 300 in the second switch state (e.g., closed) in response to the door or panel 111 being in the open position, and the tamper detection processor 300 wakes up at 204 by executing startup instructions in response to being powered up. At 206, in one example, the tamper detection processor 300 determines whether the switch 113 is activated indicating the door or panel is opened. If not (NO at 206), the tamper detection processor 300 returns to monitoring the switch 113 to determine the door panel switch activation state at 202. Otherwise (YES at 206), the tamper detection processor 300 stores a tamper event code in a non-volatile memory 114 at 208. The tamper event code is a unique code stored in the non-volatile memory 114 that indicates that a tamper event has been detected by the tamper detection apparatus 112, 113. In one implementation, the tamper detection processor 300 time stamps the tamper event code and stores a timestamped tamper event code in the nonvolatile memory 114 at 208.

At 210, in one example, the tamper detection processor 300 returns to a low power (e.g., sleep) mode at 210. The method 200 also includes operations by the system processor 115 in certain implementations. At 212, if the system processor 115 remains powered down (NO at 212), the method 200 returns to 202, and any further door/panel opening events are detected and corresponding tamper event codes are stored in the non-volatile memory 114 as described above. Once the system processor 115 powers up (YES at 212), the system processor 115 in one example asserts the VCC override pin to an active state at 214. At 216, the system processor 115 reads the non-volatile memory 114 to obtain any stored tamper event codes. The system processor 115 or the tamper detection processor 300 determines at 218 whether any tamper detection event code is stored in the non-volatile memory 214 at 218.

In one example, the system processor 115 and the tamper detection processor 300 are interconnected via a serial communications link, and the system processor 115 requests the stored tamper event code or codes from the tamper detection processor 300. The tamper detection processor 300 in this example responds by reading any stored tamper event code or codes from the non-volatile memory 114. If there are no stored tamper event codes, the tamper detection processor 300 sends a reply to the system processor 115 indicating that no tamper events were detected. If there are one or more tamper event codes stored in the non-volatile memory 114, the tamper detection processor 300 sends the tamper event code or codes to the system processor 115 at 216. In another possible implementation, the system processor 115 directly reads the non-volatile memory 114 at 216 and determines at 218 whether there are any stored tamper event code or codes.

At 220, the system processor 115 records a system event in its own memory indicating the tamper event occurrence and any included timestamp. In one implementation, the system processor 115 indicates tamper event information on the user interface 119 and/or sense tamper event information to another system via the network 108. In one example, the system processor 115 performs a check of configuration data or information associated with the industrial product 102 and determines whether a disable output function has been enabled at 222. If so (YES at 222), the system processor 115 disables the drive output at 224 in order to prevent operation of the motor 106, or otherwise refrains from operating a machine or process pending reset of the industrial product 102 by a user. At 226, once the tamper event code or codes have been read from the non-volatile memory 114, in one example, the system processor 115 or the tamper detection processor 300 clears the tamper event code section of the non-volatile memory 114. In the illustrated example, the system processor 115 sends a command at 226 to the tamper detection processor 132 clear the tamper event code or codes from the non-volatile memory 114. In one implementation, the system processor 115 disables the VCC override pin, for example, by setting a voltage to a deactivated state at 228. Thereafter, the method 200 returns to monitor further door or panel switch activation at 202 as previously described.

In certain implementations, the tamper detection apparatus 112, 113 also operates while the industrial product 102 is operating in a powered state (e.g., while the motor 106 is being controlled by the electronic components 115-118 with power from the power supply 120, although not a strict requirement of all possible implementations. The tamper detection apparatus 112, 113 facilitates tamper detection while the industrial product 102 is not operating powered up. The tamper detection circuit 112 detects the switch state of the switch 113 to determine any events involving opening of the equipment and records the event for access when the industrial product 100 to is powered up again. The system processor 115 then evaluates the event or events to determine whether the equipment might be safe to operate. The disclosed examples thus provide an improvement in tamper detection while the industrial product 102 is un-powered, and certain examples also provide tamper detection when the industrial product 102 is powered.

In one example, the system event recorded by the system processor 115 can prompt a notification to a user or operator that access to the internals of the industrial product 102 have occurred. The user can then determine the reason for the opening and violating the tamper detection switch. The opening could be simply a maintenance access that is honorable, expected or scheduled. The tamper detection switch just notifies that such an event did occur. Moreover, nefarious tampering with an industrial product 102 might be more likely to occur during un-powered states, since in normal operation of a drive, it may be dangerous to open a cabinet or product while live due to the presence of potentially high voltages within the enclosure 110. The described examples improve on the state of the art by providing a tamper detection mechanism for a serviceable industrial product 102 that performs tamper event monitoring and logging while the product is powered or unpowered.

Figure 5:
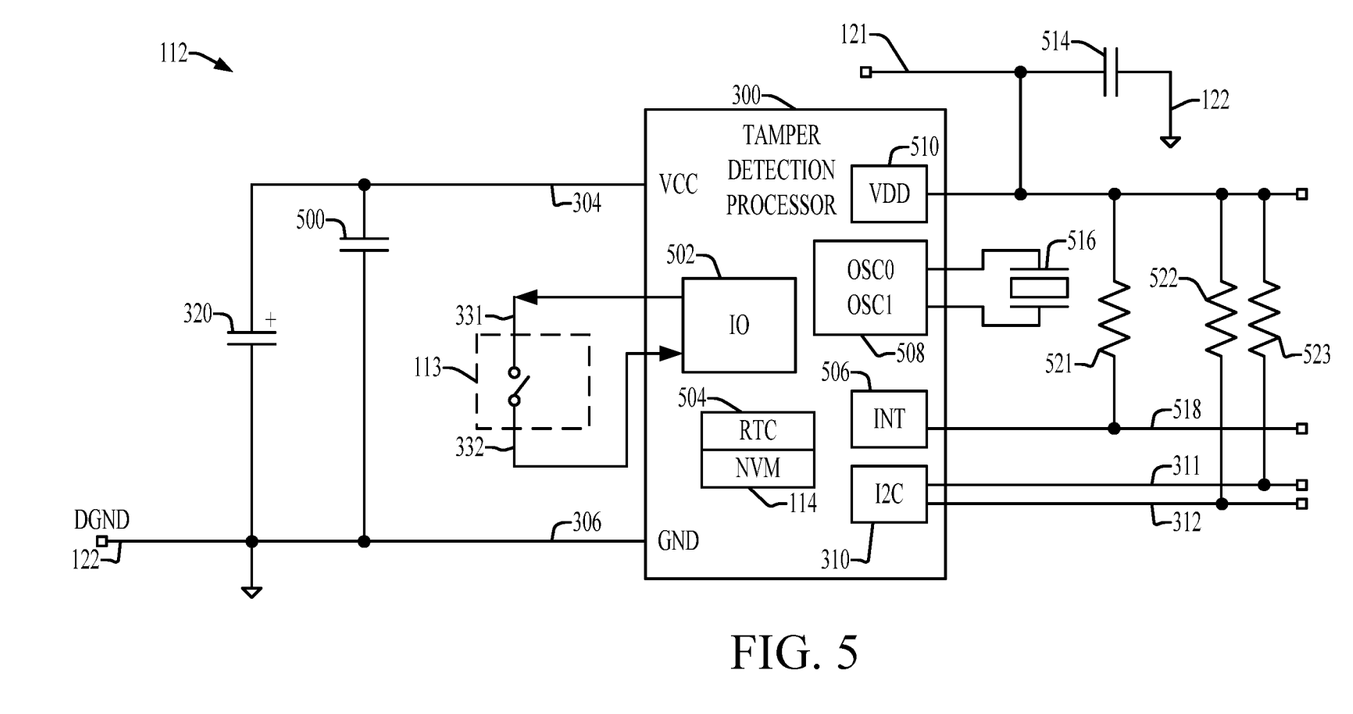
FIG. 5 is a schematic diagram of another example tamper detection circuit in the system of FIG. 1.
Figure 6:
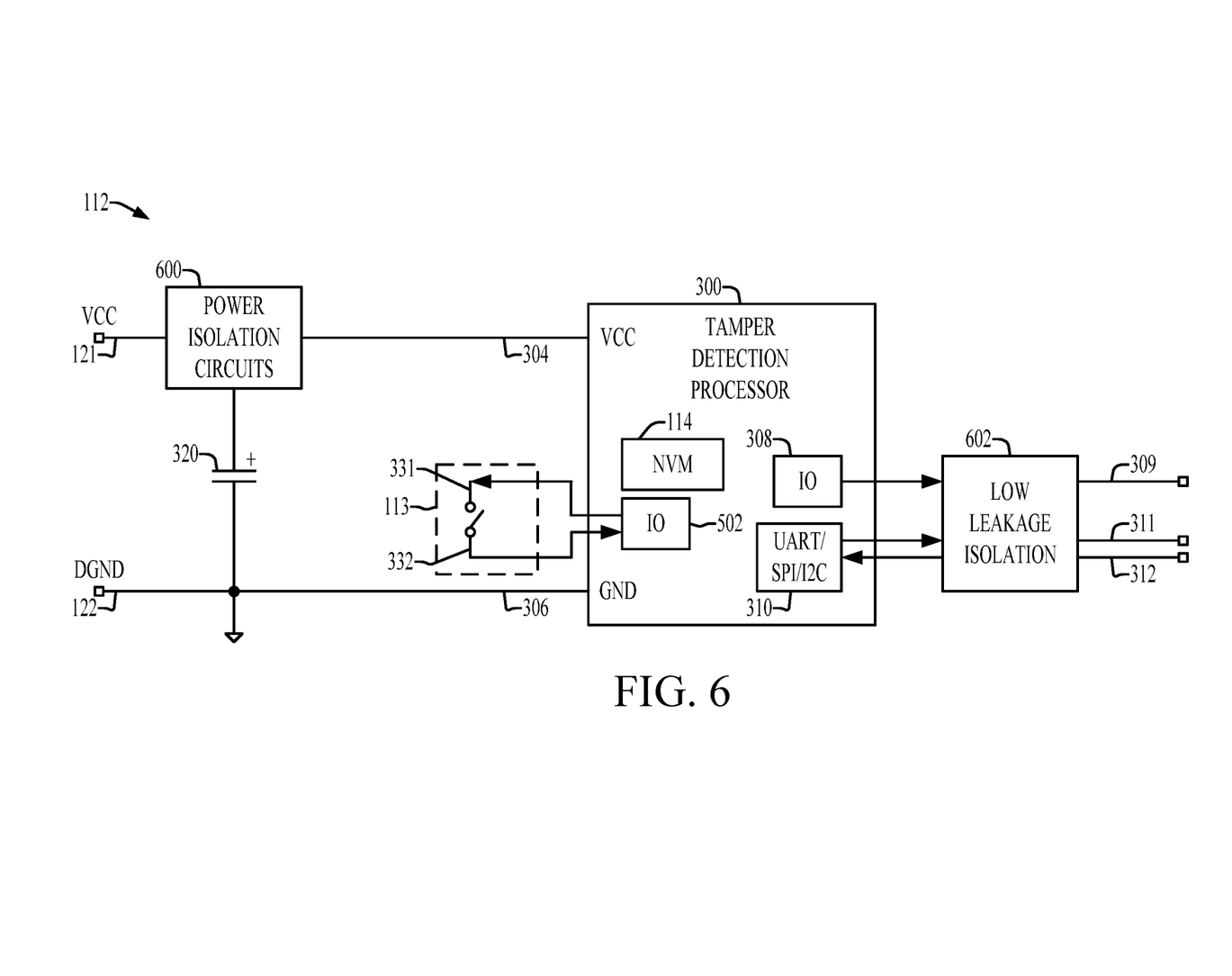
FIG. 6 is a schematic diagram of another example tamper detection circuit in the system of FIG. 1.
Figure 7:
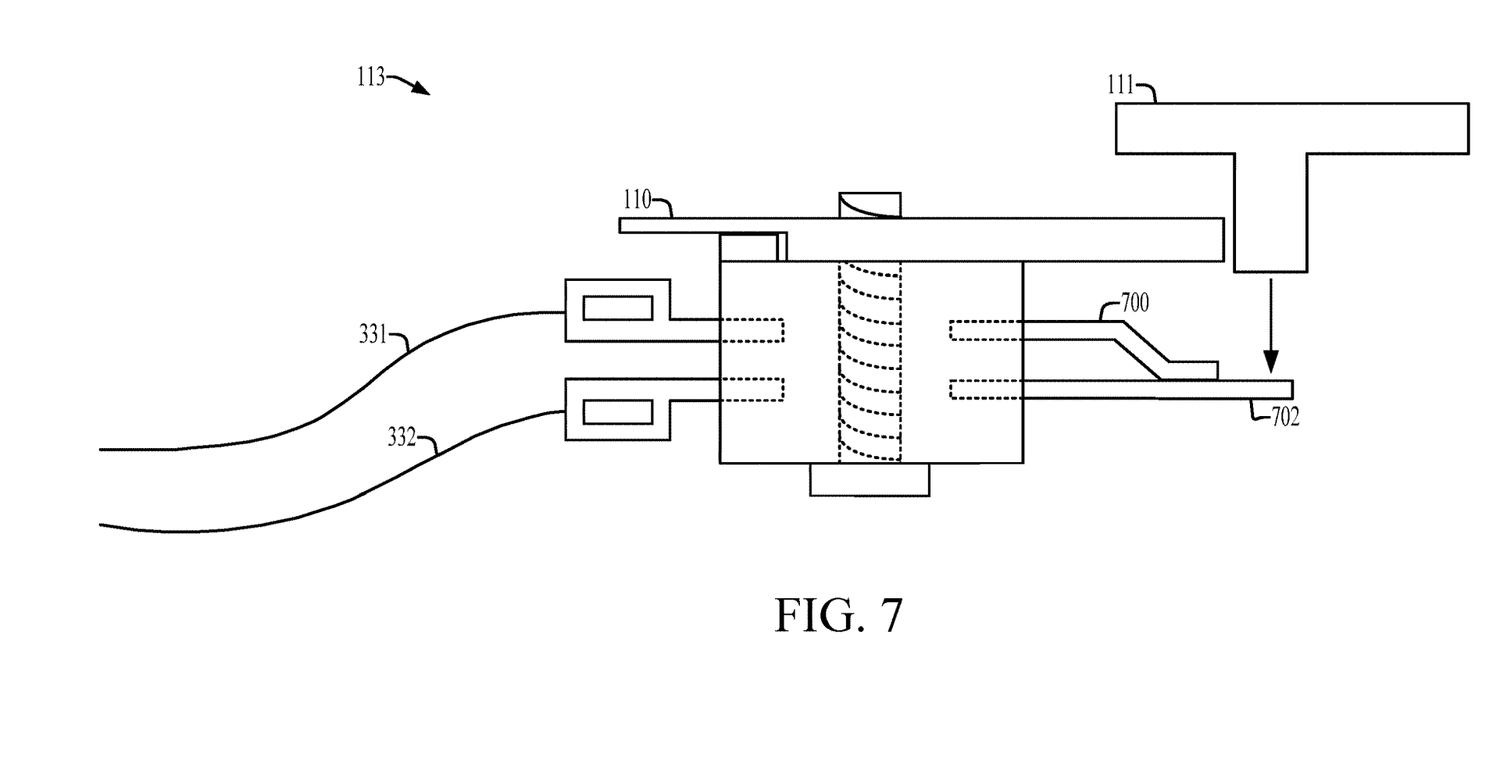
FIG. 7 is a schematic diagram of an example mechanical tamper detection switch in the system of FIG. 1.
Figure 8:
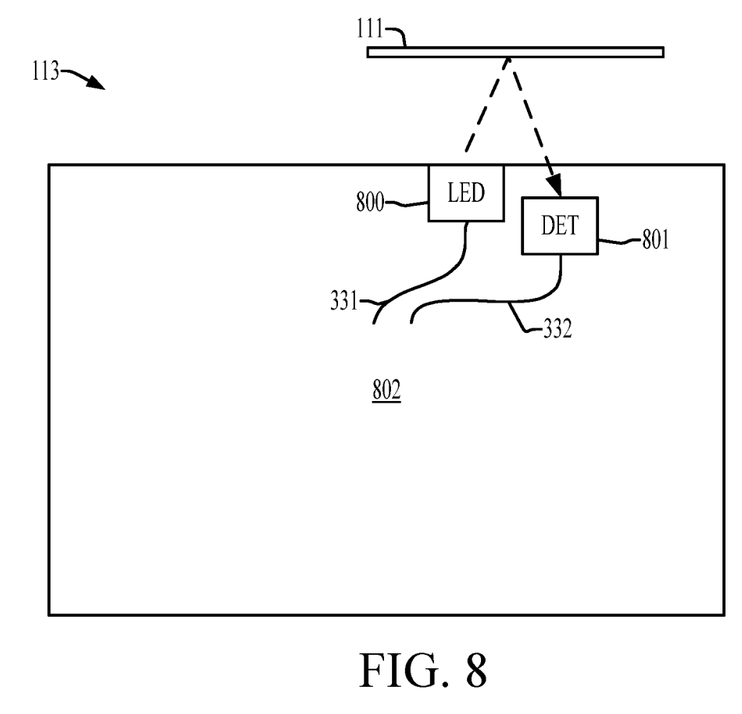
FIG. 8 is a schematic diagram of an example optical tamper detection switch in the system of FIG. 1.
Figure 9:
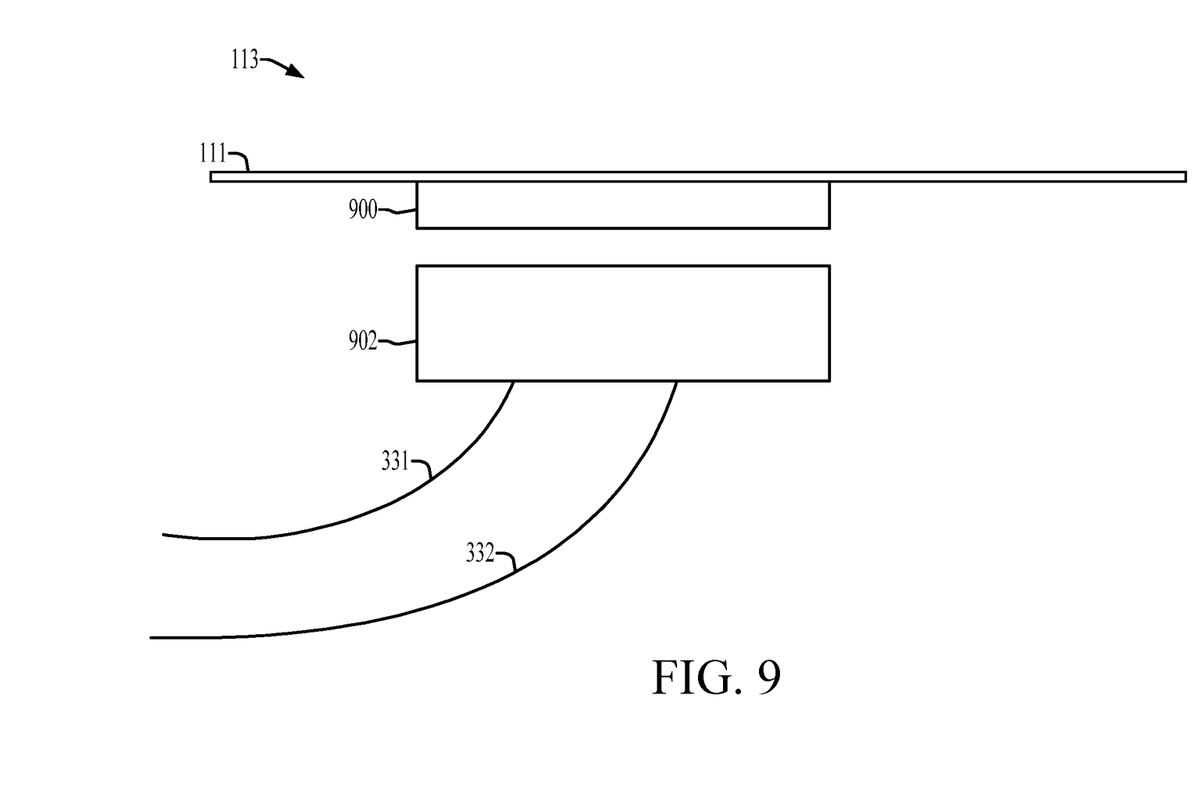
FIG. 9 is a schematic diagram of an example magnetic tamper detection switch in the system of FIG. 1.

FIGS. 3-6 illustrate several non-limiting approaches to implementing a tamper detection circuit 112, and FIGS. 7-9 show different non-limiting examples of the switch 113 for use with the tamper detection circuit 112. In FIGS. 3-6, four schemes are presented to provide tamper detection when the industrial product 102 is un-powered and then violated by opening a panel and/or a door 111. Any of these approaches can save multiple tamper events for the industrial product 102.

FIG. 3 is a schematic diagram of an example tamper detection circuit 112 in the system 100 of FIG. 1. The tamper detection circuit 112 in this example includes a tamper detection processor 300, such as a CPU, microcontroller, microprocessor, etc., having an integral non-volatile memory (NVM) 114. The tamper detection processor 300 has a power pin 304 (labeled VCC in FIG. 3), and a ground pin 306 (labeled GND). The tamper detection processor 300 in this example also includes one or more input/output (I/O) circuits 308, one of which is coupled to a terminal 309 to optionally provide a disable output from the tamper detection processor 300 to the system processor 115, and a universal asynchronous receiver transmitter (UART) port 310 coupled to communications terminals 311 and 312, for example, to communicate with the system processor 115 of FIG. 1. The switch 113 controls circuitry that selectively applies power to the power pin 304 from a local power supply 320 (e.g., a battery or charged capacitor, such as a super capacitor) 320. The positive terminal of the local power supply 320 is coupled through an auctioneering diode 324 to the first output 121 to provides a DC supply voltage VCC of the power supply 120 of FIG. 1, and the negative terminal of the local power supply 320 is coupled to the ground or reference terminal 122 (DGND). The diode 324 allies charging of the local power supply 320 with power from the power supply 120 when the power supply 120 is turned on.

The switch 113 is coupled between the reference terminal 122 and a gate control terminal of a p-channel field effect transistor 330. The switch 113 includes a first terminal 331, a second terminal 332; and an actuating mechanism or circuit that is proximate to the door or panel 111 of the enclosure 110. The switch 113 has a first switch state (e.g., open) in response to the door or panel 111 being in the closed position that prevents user access to the interior of the enclosure 110, as well as a second switch state (e.g., closed) in response to the door or panel 111 being in the open position that allows user access to the interior of the enclosure 110. In this example, opening the door or panel 111 closes the switch 113 and turns on the transistor 330, thereby coupling the power pin 304 of the tamper detection processor 300 to the local power supply 320. This turns on the tamper detection processor 330, which responds by storing the tamper event code in the non-volatile memory 114.

The example tamper detection circuit 112 in FIG. 3 also includes a second p-channel field effect transistor 334 coupled between the first output 121 of the power supply 120 and the power pin 304 of the tamper detection processor 300. A resistor 340 is coupled between a VCC override pin and the base of an NPN bipolar transistor 342. A second resistor 344 is coupled between the collector of the transistor 342 and the first output 121 of the power supply 120. In addition, the collector of the bipolar transistor 342 is coupled to the gate control terminal of the p-channel transistor 334. The gate of the transistor 334 is also coupled to a second terminal of the I/O circuit 308. When the system processor 115 asserts the VCC override signal high, this turns on the bipolar transistor 342, which in turn turns on the p-channel field effect transistor 334, in order to power the tamper detection processor 300 when the power supply 120 is turned on, for example, so that the system processor 115 can communicate with the tamper detection processor 300 and obtain any stored tamper event codes, directly or indirectly, from the non-volatile memory 114. In this example, and the example of FIG. 4 below, the tamper detection circuit 112 is responsive to the switch 113 having the second switch state when an electronic component or system 115, 116, 117, 118 of the industrial product 102 is in the unpowered state to store a tamper event code in the non-volatile memory 114.

In the example of FIG. 3, if the VCC override pin goes low during the tamper detection processor power up, the tamper detection processor 300 stores a tamper event code in the non-volatile memory 114 to record a tamper event as the switch 113 is presumed to have been closed, and hence the door or panel 111 is presumed to have been opened before the VCC override pin went low.

In the examples of FIGS. 3 and 4, moreover, the switch 113 is configured to selectively provide power to the tamper detection processor 300 in the second switch state closed in response to the door or panel 111 being in the open position. In the example of FIG. 3, the switch 113 controls other circuitry (e.g., transistor 330) to indirectly cause power to be applied to the tamper detection processor 300 in response to the door or panel 111 being in the open position. In another possible implementation, the switch 113 is coupled directly between the battery or charged capacitor 320 and the power pin 304 of the tamper detection processor 300 in order to selectively provide power from the battery or local power supply 320 to power up the tamper detection processor 300 in response to the door or panel 111 being in the open position. In these and other implementations, the switch 113 is configured to selectively couple the local power supply 320 to the tamper detection processor 300 in the second switch state closed in response to the door or panel 111 being in the open position. As discussed above, the system processor 115 can be configured for selective output disable functionality, for example, to selectively disable the normal motor drive operation or other control functions of the industrial product 102.

In one implementation, the tamper detection circuit 112 is implemented using a simple, low-cost, low power CPU device 300, which need not be integrated with a real-time clock device, instead leveraging the system real-time clock for time stamping by the system processor 115. This implementation provides multiple tamper event detections when not powered up. In one example, the system processor 115 activates the tamper detection processor 300 on power up to handle possible non-powered events (e.g., detection and clearing events). The tamper detection circuit 112 in this example implements a generic interface for communications with system processor 115 (e.g., UART, SPI, I2C, or other). The example tamper detection circuit 112 has low current drain (e.g., near zero), and uses a field effect transistor 332 manage backup power source loading of the local power supply 320. This implementation advantageously provides the ability to latch a tamper detection event during non-powered operation that is low cost. This example tamper detection circuit 112 also allows the system processor 115 to monitor tamper events that occurred when powered up. The system can monitor whether a non-powered violation did occur.

FIG. 4 is a schematic diagram of another example tamper detection circuit 112 in the system 100 of FIG. 1. Like the example of FIG. 3, the example tamper detection circuit 112 in FIG. 4 has the local power supply 320 and the p-channel FET 330 that selectively powers up the tamper detection processor 300 in response to closure of the switch 113. This example further provides a second diode 400 with an anode coupled to the first output 121 of the power supply 120, and a cathode coupled to the power pin 304 to power the tamper detection processor 300 when the power supply 120 is turned on, and a second transistor 402 with a gate coupled to the gate of the first transistor 330 in order to disconnect the tamper detection processor input load from the local power supply 320 when the main power supply 120 is turned on. In other respects, the tamper detection circuit 112 in FIG. 4 operates in similar fashion to the example of FIG. 3 described above.

FIG. 5 is a schematic diagram of yet another example tamper detection circuit 112 in the system 100 of FIG. 1, which includes a tamper detection processor 300 as generally described above, with a bypass capacitor 500 coupled across the local power supply 320. In this example, and that of FIG. 6 below, the switch 113 is coupled to an IO terminal 502 of the tamper detection processor 300. In one implementation, the I/O terminal 502 includes two connections respectively coupled to the first and second terminals 331 and 332 of the switch 113. The tamper detection processor 300 in this example includes a real-time clock (RTC) 504, and the tamper detection processor 300 stores the tamper event code in the non-volatile memory 114 including a timestamp indicating the time at which the tamper event was detected by closure of the switch 113.

The tamper detection processor 300 in FIG. 5 also includes an interrupt input 506, and oscillator terminals 508, as well as a separate supply input (VDD) 510. The input 510 is coupled to the first output 121 of the power supply 120, and a bypass capacitor 514 is coupled between the input 510 and the ground reference 122. The tamper detection circuit 112 in this example also includes an oscillator 516 coupled to the oscillator input 508, as well as an interrupt terminal 518 with a pull-up resistor 521 coupled between the interrupt terminal 518 and the first output 121 of the power supply 120. Further pull-up resistors 522 and 523 are coupled between the first output 121 of the power supply 120 in the respective communications lines 311 and 312. This example uses an I2C communications port 310, but other forms of communications ports can be used (e.g., UART, SPI, I2C, or other). In this example, the tamper detection circuit 112 includes a real time clock RTC 504; and the tamper detection processor 300 is configured to store a time stamped tamper event code in the non-volatile memory 114 in response to detection of the door or panel 111 being in the open position when the electronic component or system 115, 116, 117, 118 is in the powered or unpowered state.

In one implementation of the tamper detection circuits 112 of FIGS. 5 and/or 6, the tamper detection processor 300 is configured to periodically wake up to evaluate the state of the switch 113, for example, by sending pseudo random serial sequence through a normally closed switch 113, in which case the tamper detection processor 300 will ensure the correct sequence is received if the switch 113 is closed, in order to ensure no one is tampering with the switch 113, for example by shorting the switch 113 high, low, or trying to manipulate the serial string transmitted through the switch 113. In this example, the tamper detection processor 300 will store a tamper event code, with or without timestamp, if the serial string received at second switch terminal 332 is different than the serial string transmitted to the first switch terminal 331.

When un-powered, the local power supply 320 (super capacitor, battery or other) provides backup. The circuit is designed to disconnect any load off the local power supply 320 for the longest life. When periodic interval is active, and the tamper switch event has occurred, the tamper detection processor 300 stores a corresponding tamper event code in the non-volatile memory 114. The non-volatile memory 114 in this example retains the tamper event code permanently or until directed by the system processor 115 to clear the event once it has been recorded. In one example, the system processor 115 sends a clear message including a special code for security protection from loss of data. The circuitry contains a few more components but does not require an override to access the tamper detection processor 300.

FIG. 6 is a schematic diagram of another example tamper detection circuit 112 in the system 100 of FIG. 1. This example is like that of FIG. 5, and further includes power isolation circuits 600 coupled to the first output 121 of the power supply 120, the positive terminal of the local power supply 320, and the power input 304 of the tamper detection processor 300. In addition, the tamper detection circuit 112 of FIG. 6 includes a local leakage isolation circuit 602 that couples the I/O port 308 with the terminal 309 and couples the communications port 310 with the communications lines 311 and 312. In one implementation, the I/O port 308 in the examples of FIGS. 3, 4, 5 and/or 6 is configured as an output from the tamper detection processor 300, which can be connected to an annunciator to provide real-time notification that a tamper event has occurred (e.g., that the door or panel 111 has been opened) and/or to provide a signal for active disablement of control operation of the industrial product 102 (e.g., disconnecting the inverter outputs from the driven load, etc.). The example of FIG. 6 implements a firmware real-time clock function.

The following table shows example features and operational characteristics of the four example tamper detection circuits 112 of the respective FIGS. 3-6. Note there can also be variants and tradeoffs to any specific method.

| Attributes | FIG. 3 | FIG. 4 | FIG. 5 | FIG. 6 |
|---|---|---|---|---|
| Un-powered operation | Yes | Yes | Yes | Yes |
| Powered operation | Yes | Yes | Yes | Yes |
| Hardware RTC | No | No | Yes | No |
| Firmware RTC | No | No | No | Yes |
| Trigger read interval | On-demand (continuous) | On-demand (continuous) | Periodic interval | Periodic interval |
| Trigger message sequence | None | None | Yes | Yes |
| Disable output | Optional | Optional | Optional | Optional |
| Power source | Super cap, battery, etc. | Super cap, battery, etc. | Super cap, battery, etc. | Super cap, battery, etc. |
| Tamper device CPU activation | Manual activation | Automatic activation | Automatic activation | Automatic activation |
| Interface | UART, SPI, I2C or equivalent | UART, SPI, I2C or equivalent | UART, SPI, I2C or equivalent | UART, SPI, I2C or equivalent |

The different tamper detection circuits 112 in these examples have different attributes for operation that can be tailored to the specific industrial product 102 or application. For example, simple implementations may not require real-time clock functionality just to record a tamper event. Some examples monitor the tamper switch 113 continuously while others at intervals to reduce power consumption. In higher security diagnostic needs, the switch 113 may be used as a medium to transfer a pseudo random serial sequence to enhanced detection from tampering (e.g., FIGS. 5 and 6). The described examples facilitate heightened security features in industrial products 102 that exceed the present industry specifications. Although illustrated and described above in connection with a motor drive industrial product 102, moreover, the described tamper detection apparatus and methods can be used in any industrial product that requires or could benefit from the heightened security measures of tamper detection.

Referring also to FIGS. 7-9, any form of detection switch 113 can be used in combination with the tamper detection circuit examples 112. In one possible implementation, the tamper detection circuit 112 is implemented in or on a control board of a motor drive industrial product 102, for example, to provide the ability to detect tampering in the industrial product 102. This implies detection by opening the product through doors and/or panels of the product packaging and enclosures 110. For example, a mechanical switch could be used, or another functionally equivalent switch 113 can be used, such as photo-LED/detector, magnetic, or other solutions. FIGS. 7-9 show three non-limiting examples, in which the switch 113 has a first terminal 331, a second terminal 332, and an actuating mechanism or circuit proximate the door or panel 111 of the enclosure 110. The switch 113 in various examples can be implemented with physical mechanical switch, magnetics, photo eye detection (LED/detector) or other types providing an on-off electrical contact between the switch terminals 331 and 332.

FIG. 7 is a schematic diagram of an example mechanical tamper detection switch 113 in the system of FIG. 1. This example is a mechanical switch 113 with a first contact 700 that is normally biased to be in contact with a second contact 702 when the door or panel 111 is at least partially open as shown in FIG. 7. Closure of the door or panel 111 moves the second contact 702 away from the first contact 700 by operation of a tab or plunger formed as part of the door or panel 111 (e.g., or mounted to the door or panel 111) in order to provide a normally open switch action that short-circuits the switch terminals 331 and 332 to one another when the door or panel 111 is in the open position, and otherwise provides an open circuit between the terminals 331 and 332 when the door or panel 111 is in the closed position relative to the enclosure 110. This provides tamper detection in response to an industrial product 102 being violated through the door or panel 111 being opened, whether by opening an access door or attempted disassembly of the industrial product 102 (e.g., attempting to remove a panel of the enclosure 110).

FIG. 8 is a schematic diagram of an example optical tamper detection switch 113 in the system of FIG. 1. In this example, the switch 113 uses an optical signal path that reflects light off the door or panel 111. In this example, and LED or other light source 800 and a photo detector 801 are positioned relative to one another on a printed circuit board (PCB) 802, and the PCB 802 is mounted in the interior of the enclosure 110 proximate a portion of the door or panel 111. The light source 800 is positioned so as to direct a light signal at least partially toward a surface of the door or panel 111, and the detector 801 is positioned with a sense an face at least partially facing the surface of the door or panel 111 in order to receive the light signal when the door or panel 111 is in the closed position. Opening the door or panel 111 in this example causes the detector 801 to stop receiving the light signal from the light source 800, and the signal output from the detector 802 indicates whether the door or panel is open or closed. The switch 113 in this example can include further interface circuitry, for example, to provide power to the terminal 331 to operate the light source 800, and a transistor, relay, or circuit to provide a signal to the second switch terminal 332 having to discernible states to indicate whether the door or panel 111 is open or closed. In certain implementations, a reflective material can be installed on the relevant surface of the door or panel 111 to facilitate operation of the optical switch circuit 113.

FIG. 9 is a schematic diagram of an example magnetic tamper detection switch 113 in the system of FIG. 1. In this example, the switch 113 includes a magnetic piece 900, and a reed switch or other magnetic sensor 902 that provides an electrical contact that is open or closed to the switch terminals 331 and 332 based on the proximity of the magnet 900 to the sensor 902. This form of magnetic switch 113 is advantageous, for example, when the industrial product 102 is or could be exposed to corrosive environments where its reliability is short. In this case a sealed magnetic switch may be an appropriate solution.

This description uses examples to disclose the invention and to enable any person skilled in the art to practice the invention, including making and using any devices or systems and performing any incorporated methods. The patentable scope of the invention is defined by the claims and may include other examples that occur to those skilled in the art.

Such other examples are intended to be within the scope of the claims if they have structural elements that do not differ from the literal language of the claims, or if they include equivalent structural elements with insubstantial differences from the literal language of the claims. In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Also, the terms "couple", "couples", or "coupled" are intended to include indirect or direct electrical or mechanical connection or combinations thereof. For example, if a first device couples to or is coupled with a second device, that connection may be through a direct electrical connection, or through an indirect electrical connection via one or more intervening devices and connections. In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A motor drive industrial product, comprising:
   an enclosure having a door or panel that has: an open position that allows user access to an interior of the enclosure, and a closed position that prevents user access to the interior of the enclosure;
   a system power supply located in the interior of the enclosure;
   an electronic system located in the interior of the enclosure, the electronic system selectively operative in a powered state when powered by the power supply to control a machine or process, and inoperative in an unpowered state when not powered by the power supply, said electronic system comprising a system processor selectively operatively coupled to the system power supply in a powered state and selectively decoupled from the system power supply in an unpowered state, an AC to DC converter, a DC bus circuit, a DC to AC converter, a user interface, said electronic system selectively operative in said powered state to receive three-phase electrical input power from an associated power source and to output multi-phase variable frequency, variable amplitude AC output power to drive an associated motor load; and
   a tamper detection circuit located in said interior of said enclosure, said tamper detection circuit comprising a non-volatile memory, a tamper detection processor operatively coupled to the non-volatile memory, and a local power supply comprising a battery or a charged capacitor configured to power the tamper detection processor, the tamper detection circuit configured to: detect the door or panel being in the open position when the electronic component or system is in the unpowered state, and store a first tamper event code in the non-volatile memory in response to detection of the door or panel being in the open position when the electronic component or system is in the unpowered state;
   said tamper detection circuit further comprising a real time clock, wherein the tamper detection processor is configured use an output of said real time clock to store a time stamp of said first tamper event code in the non-volatile memory to create a time stamped tamper event code;
   said motor drive further comprising a switch located in the interior of the enclosure and operatively coupled to an IO terminal of the tamper detection processor, the switch having a first switch state in response to the door or panel being in the closed position, and the switch having a second switch state in response to the door or panel being in the open position, said switch in said second state electrically connecting said local power supply to said tamper detection processor when said door or panel is in the open position to selectively provide power to the tamper detection processor in response to the door or panel being in the open position;
   the tamper detection circuit further configured to:
   transmit a pseudo random serial sequence to a first terminal of the switch;
   determine if a received signal at a second terminal of the switch matches the pseudo random serial sequence;
   storing a second tamper event code in the non-volatile memory if the received signal at the second terminal of the normally closed switch is different than the pseudo random serial sequence;
   wherein said system processor of said electronic system is configured to, in response to power up of the electronic system: (i) obtain the time stamped tamper event code or the second tamper event code from the non-volatile memory; and (ii) perform one of: (a) send a message to a network to report the time stamped tamper event code or the second tamper event code; (b) render a notification of the time stamped tamper event code or the second tamper event code on the user interface; and, (iii) disable operation of the motor drive based on the time stamped tamper event code or the second tamper event code.

2. The motor drive industrial product of claim 1, wherein the tamper detection circuit is further configured to: detect the door or panel being in the open position when the electronic component or system is in the powered state and said unpowered state, and store the first tamper event code in the non-volatile memory in response to detection of the door or panel being in the open position when the electronic component or system is in the powered and said unpowered state.

3. A tamper detection apparatus for a motor drive, said tamper detection apparatus comprising:
   a switch located in an interior of an enclosure of the motor drive; the switch including: a first terminal, a second terminal; and an actuating mechanism or circuit proximate a door or panel of the enclosure, the switch having: a first switch state in response to the door or panel being in a closed position that prevents user access to the interior of the enclosure; and a second switch state in response to the door or panel being in an open position that allows user access to the interior of the enclosure; and
   a tamper detection circuit coupled to the first and second terminals of the switch and including a non-volatile memory, the tamper detection circuit responsive to the switch having the second switch state when the motor drive system is in the unpowered state to store a first tamper event code in the non-volatile memory;
   said tamper detection circuit further comprising a tamper detection processor operatively coupled to the non-volatile memory and comprising an IO terminal operatively coupled to the switch, and said tamper detection circuit further comprising a local power supply comprising a battery or a charged capacitor, wherein the switch is configured to selectively couple the battery or charged capacitor to the tamper detection processor in the second switch state to provide power to the tamper detection processor from the battery or charged capacitor in response to the door or panel being in the open position;

the tamper detection circuit configured to:

transmit a pseudo random serial sequence to the first terminal of the switch;

determine if a received signal at the second terminal of the switch matches the pseudo random serial sequence;

store a second tamper event code in the non-volatile memory if the received signal at the second terminal of the switch is different than the pseudo random serial sequence;

wherein said system processor of said electronic system is configured to, in response to power up of the electronic system: (i) obtain the first tamper event code or the second tamper event code from the non-volatile memory; and (ii) perform one of: (a) send a message to a network to report the first tamper event code or the second tamper event code; (b) render a notification of the first tamper event code or the second tamper event code on the user interface; and, (iii) disable operation of the motor drive based on the first tamper event code or the second tam per event code.

4. The tamper detection apparatus of claim 3, wherein the tamper detection circuit further includes a real time clock; wherein the tamper detection processor is configured to store a time stamp with the first tamper event code in the non-volatile memory in response to detection of the door or panel being in the open position when the motor drive system is in the unpowered state.

5. A method for detecting tampering in a motor drive, said method comprising:

detecting a door or panel of a motor drive enclosure being in an open position that allows user access to an interior of the enclosure when an electronic system in the interior of the enclosure is in an unpowered state; and in response to detecting the door or panel being in the open position when the electronic system is in the unpowered state, storing a first tamper event code in a non-volatile memory in the interior of the enclosure;

transmitting a pseudo random serial sequence to a first terminal of a normally closed switch associated with the door or panel;

determining if a received signal at a second terminal of the normally closed switch matches the pseudo random serial sequence;

storing a second tamper event code in a non-volatile memory in the interior of the enclosure if the received signal at the second terminal of the normally closed switch is different than the pseudo random serial sequence;

in response to power up of the electronic system: (i) obtaining the first or second tamper event code from the non-volatile memory; and (ii) performing one of: (a) sending a message to a network to report the first or second tamper event code; (b) rendering a notification of the first or second tamper event code on a user interface; and, (iii) disabling operation of the electronic system based on the first or second tamper event code.

* * * * *